United States Patent
Makansi

(10) Patent No.: US 7,456,543 B2
(45) Date of Patent: Nov. 25, 2008

(54) CLOSELY SPACED ELECTRODES WITH A UNIFORM GAP

(75) Inventor: Tarek Makansi, Tuscon, AZ (US)

(73) Assignee: Tempronics, Inc., Tucson, AZ (US)

( * ) Notice: Subject to any disclaimer, the term of this patent is extended or adjusted under 35 U.S.C. 154(b) by 519 days.

(21) Appl. No.: 11/344,622

(22) Filed: Jan. 31, 2006

(65) Prior Publication Data

US 2006/0138896 A1    Jun. 29, 2006

(51) Int. Cl.
H02N 3/00    (2006.01)
F25B 21/02    (2006.01)

(52) U.S. Cl. .................. 310/306; 136/205; 136/253; 136/243; 62/3.1

(58) Field of Classification Search ............... 310/306; 62/3.1, 3.2; 136/205, 243, 253, 254
See application file for complete search history.

(56) References Cited

U.S. PATENT DOCUMENTS

| 4,343,993 | A | 8/1982 | Binnig et al. |
|---|---|---|---|
| 6,064,137 | A * | 5/2000 | Cox .......................... 310/306 |
| 6,651,760 | B2 | 11/2003 | Cox et al. |
| 6,720,704 | B1 | 4/2004 | Tavkhelidze et al. |
| 6,774,003 | B2 | 8/2004 | Tavkhelidze et al. |
| 6,876,123 | B2 | 4/2005 | Martinovsky et al. |
| 6,946,596 | B2 * | 9/2005 | Kucherov et al. ........... 136/205 |
| 2001/0046749 | A1 | 11/2001 | Tavkhelidze et al. |
| 2002/0170172 | A1 | 11/2002 | Tavkhelidze et al. |
| 2004/0050415 | A1 | 3/2004 | Kucherov et al. |
| 2004/0195934 | A1 | 10/2004 | Tanielian .................... 310/306 |
| 2005/0184603 | A1* | 8/2005 | Martsinovsky ............ 310/49 R |
| 2005/0189871 | A1* | 9/2005 | Tavkhelidze et al. ........ 313/498 |
| 2006/0000226 | A1 | 1/2006 | Weaver, Jr. .................... 62/132 |
| 2006/0138896 | A1 * | 6/2006 | Makansi ..................... 310/306 |
| 2007/0137687 | A1 | 6/2007 | Tanielian .................... 136/205 |

OTHER PUBLICATIONS

"Analysis of Nanometer Vacuum Gap Formation in Thermo-tunneling Devices", Enikov et al., Nanotechnology 19 (2008), Jan. 31, 2008.*

Refrigeration by Combined Tunneling and Thermionic Emission in Vacuum: Use of Nanometer Scale Design, Y. Hishinuma, T.H. Geballe, B.Y. Moyzhes, Applied Physics Letters, vol. 78, No. 17, Apr. 23, 2001, abstract only.

(Continued)

*Primary Examiner*—Karl I Tamai
(74) *Attorney, Agent, or Firm*—Hayes Soloway P.C.

(57) ABSTRACT

An improved design for maintaining separation between electrodes in tunneling, diode, thermionic, and other devices is disclosed. At least one electrode is made from flexible material. A magnetic field is present to combine with the current flowing in the flexible electrode and generate a force that counterbalances the electrostatic force between the electrodes. The balancing of forces allows the separation and parallelism between the electrodes to be maintained at a very small spacing without requiring the use of multiple control systems, actuators, or other manipulating means, or spacers. The shape of one or both electrodes is designed to maintain a constant separation over the entire overlapping area of the electrodes. The end result is an electronic device that maintains two closely spaced parallel electrodes in stable equilibrium with a uniform gap therebetween over a large area in a simple configuration for simplified manufacturability and use to convert heat to electricity or electricity to cooling.

47 Claims, 9 Drawing Sheets

OTHER PUBLICATIONS

Vacuum Thermionic Refrigeration with a Semiconductor Heterojunction Structure, Y. Hishinuna, T.H. Geballe, B.Y. Moyzhes, Applied Physics Letters, vol. 81, No. 22, Nov. 25, 2002, abstract only.

Design and Characterization of Thin Film Microcoolers, Chris LaBounty, Ali Shakouri, John E. Bowers, Journal of Applied Physics, vol. 89, No. 7, Apr. 1, 2001, abstract only.

Possible Cooling by Resonant Fowler-Nordheim Emission, A.N. Korotkov and K.K. Likharev, Applied Physics Letters, vol. 75, No. 16, Aug. 23, 1999, abstract only.

Thermionic Refrigeration, G.D. Mahan, Journal of Applied Physics, vol. 76, No. 7, Oct. 1, 1994, abstract only.

Multilayer Thermionic Refrigerator, G.D. Mahan, J.A. Sofao and M. Bartkoiwak, Journal of Applied Physics, vol. 83, No. 9, May 1, 1998, abstract only.

Mesurements of Cooling by Room Termperation Thermionic Emission Across a Nanometer Gap, Y. Hishinuma, T.H. Geballe, B.Y. Moyzhes, T.W. Kenny, Journal of Applied Physics, vol. 94, No. 7, Oct. 1, 2003, abstract only.

"Quantum, Cylic, and Particle-Exchange Heat Engines", Humphrey et al., Physica E29 390-398, 2005, no month provided.

\* cited by examiner

CLOSELY SPACED ELECTRODES WITH A UNIFORM GAP

BACKGROUND

1. Field of the Invention

The present invention pertains to diode, thermionic, tunneling, and other devices that are designed to have very small spacing between electrodes and in some cases also require thermal isolation between electrodes. The invention may be applied to thermo-tunneling generators and heat pumps, and can be applied to similar systems using thermionic and thermoelectric methods. These thermo-tunneling generators and heat pumps convert thermal energy into electrical energy and can operate in reverse to provide refrigeration. The invention may also be applied to any device that requires close, parallel spacing of two electrodes with a voltage applied and current flowing between them.

2. Description of the Prior Art

The phenomenon of high-energy electron flow from one conductor (emitter) to another conductor (collector) has been used in many electronic devices and for a variety of purposes. For example, vacuum-tube diodes were implemented this way, and the physical phenomenon was called thermionic emission. Because of the limitations imposed by the relatively large physical spacing available, these diodes needed to operate at a very high temperature (greater than 1000 degrees Kelvin). The hot electrode needed to be very hot for the electrons to gain enough energy to travel the large distance to the collector and overcome the high quantum barrier. Nevertheless, the vacuum tube permitted electronic diodes and later amplifiers to be built. Over time, these devices were optimized, by using alkali metals, like cesium, or oxides to coat the electrodes, in an effort to reduce the operating temperature. Although the temperatures for thermionic generation are still much higher than room temperature, this method of power generation has utility for conversion of heat from combustion or from solar concentrators to electricity.

Later, it was discovered that if the emitter and the collector were very close to each other, on the order of atomic distances like 2 to 20 nanometers, then the electrons could flow at much lower temperatures, even at room temperature. At this small spacing, the electron clouds of the atoms of the two electrodes are so close that hot electrons actually flow from the emitter cloud to the collector cloud without physical conduction. This type of current flow when the electron clouds are intersecting, but the electrodes are not physically touching, is called tunneling. The scanning tunneling microscope, for example, uses a pointed, conducting stylus that is brought very close to a conducting surface, and the atomic contours of this surface can be mapped out by plotting the electrical current flow as the stylus is scanned across the surface. U.S. Pat. No. 4,343,993 (Binnig, et al.) teaches such a method applied to scanning tunneling microscopy.

It has been known in the industry that if such atomic separations could be maintained over a large area (one square centimeter, for example), then a significant amount of heat could be converted to electricity by a single diode-like device and these devices would have utility as refrigerators or in recovering wasted heat energy from a variety of sources. See *Efficiency of Refrigeration using Thermotunneling and Thermionic Emission in a Vacuum: Use of Nanometer Scale Design*, by Y. Hishinuna, T. H. Geballe, B. Y. Moyzhes, and T. W. Kenny, Applied Physics Letters, Volume 78, No. 17, 23 Apr. 2001; *Vacuum Thermionic Refrigeration with a Semiconductor Heterojunction Structure*, by Y. Hishinuna, T. H. Geballe, B. Y. Moyzhes, Applied Physics Letters, Volume 81, No. 22, 25 Nov. 2002; and *Measurements of Cooling by Room Temperature Thermionic Emission Across a Nanometer Gap*, by Y. Hishinuma, T. H. Geballe, B. Y. Moyzhes, and T. W. Kenny, Journal of Applied Physics, Volume 94, No. 7, 1 Oct. 2003. The spacing between the electrodes must be small enough to allow the "hot" electrons (those electrons with energy above the Fermi level) to flow, but not so close as to allow normal conduction (flow of electrons at or below the Fermi level). There is a workable range of separation distance between 2 and 20 nanometers that allows thousands of watts per square centimeter of conversion from electricity to refrigeration. See *Efficiency of Refrigeration using Thermotunneling and Thermionic Emission in a Vacuum: Use of Nanometer Scale Design*, by Y. Hishinuna, T. H. Geballe, B. Y. Moyzhes, and T. W. Kenny, Applied Physics Letters, Volume 78, No. 17, 23 Apr. 2001. These references also suggest the advantage of a coating or monolayer of an alkali metal, or other material, on the emitting electrode in order to achieve a low work function in the transfer of electrons from one electrode to the other. This coating or monolayer further reduces the operating temperature and increases the efficiency of conversion.

Mahan showed that the theoretical efficiency of a thermionic refrigerator, using electrodes with a work function of 0.7 eV and a cold temperature of 500 K, is higher than 80% of Carnot efficiency. See *Thermionic Refrigeration*, By G. D. Mahan, Journal of Applied Physics, Volume 76, No. 7, 1 Oct. 1994. By analogy a conversion efficiency of the electron tunneling process is expected to also be a high fraction of Carnot efficiency. Carnot efficiency presents an upper bound on the achievable efficiency of thermal energy conversion.

The maintenance of separation of the electrodes at atomic dimensions over a large area has been the single, most significant challenge in building devices that can remove heat from a conductor. The scanning tunneling microscope, for example, requires a special lab environment that is vibration free, and its operation is limited to an area of a few square nanometers. Even very recently, all measurements of cooling in a working apparatus have been limited to an area of a few square nanometers. See *Measurements of Cooling by Room Temperature Thermionic Emission Across a Nanometer Gap*, by Y. Hishinuma, T. H. Geballe, B. Y. Moyzhes, and T. W. Kenny, Journal of Applied Physics, Volume 94, No. 7, 1 Oct. 2003.

Hence, there remains a need for a device which cost-effectively and efficiently converts heat energy into electrical energy in a package that is convenient to use for both the heat source as input and the electrical circuits needing power as output. Abundant sources of heat, including waste heat, could easily become sources of electricity. Examples where employing such devices would help the environment, save money, or both, include:

(1) Conversion of the sun's heat and light into electricity more cost effectively than photovoltaic devices currently used. Many articles describe the use of high temperature thermionic emission to recycle thermal energy from solar collectors by using such heat conversion devices. See *Thermionic Refrigeration*, By G. D. Mahan, Journal of Applied Physics, Volume 76, No. 7, 1 Oct. 1994; and *Multilayer Thermionic Refrigerator*, By G. D. Mahan, J. A. Sofao and M. Bartkoiwak, Journal of Applied Physics, Volume 83, No. 9, 1 May, 1998. However such conversions could be less costly and more prevalent if tunneling were achieved at naturally occurring temperatures.

(2) Recovery of the heat generated by an internal combustion engine, like that used in automobile, back into useful motion. Some automobiles available today, called hybrid gas-electric automobiles, can use either electrical power or internal combustion to create motion. About 75% of the energy in gasoline is converted to waste heat in today's internal combustion engine. A tunneling conversion device could recover much of that heat energy from the engine of a hybrid automobile and put it into the battery for later use. U.S. Pat. No. 6,651,760 (Cox, et al.) teaches a method of converting the heat from a combustion chamber and storing or converting the energy to motion.

(3) Reducing the need for noxious gases to enter the atmosphere. The more energy-efficient hybrid automobile is a clear example where noxious exhaust gases escaping into the atmosphere can be reduced. A device that converts engine and exhaust heat of the hybrid engine and then stores or produces electricity in the hybrid battery would further increase the efficiency of the hybrid automobile and reduce the need to expel noxious gases. Coolants used in refrigeration are other examples of noxious gases that are necessary to remove heat, and tunneling conversion devices could reduce the need for emission of noxious gases.

(4) Recovery of heat energy at a time when it is available, then storing it as chemical energy in a battery, and then re-using it at a time when it is not available. Tunneling conversion devices could convert the sun's energy to electricity during the day and then store it in a battery. During the night, the stored battery power could be used to produce electricity.

(5) Power generation from geothermal energy. Heat exists in many places on the surface of the earth, and is virtually infinitely abundant deep inside the earth. An efficient tunneling conversion device could tap this supply of energy.

(6) Production of refrigeration by compact, silent and stationary solid state devices, where such a tunneling device could provide cooling for air conditioners or refrigeration to replace the need for bulky pneumatic machinery and compressors.

(7) Power generation from body heat. The human body generates about 100 watts of heat, and this heat can be converted to useful electrical power for handheld products like cell phones, cordless phones, music players, personal digital assistants, and flashlights. A thermal conversion device as presented in this disclosure can generate sufficient power to operate or charge the batteries for these handheld products from heat applied through partial contact with the body.

(8) Electrical power from burning fuel. A wood stove generates tens of thousands of watts of heat. Such a tunneling device could generate one or two kilowatts from that heat which is enough to power a typical home's electric appliances. Similar applications are possible by burning other fuels such as natural gas, coal, and others. Then homes in remote areas may not require connection to the power grid or noisy electrical generators to have modern conveniences.

The challenge in bringing two parallel electrodes together within less than 20.0 nanometer separation gap requires attention to two parameters. One is the surface roughness and the other is the surface flatness. Surface roughness is the deviation from smoothness in a small, local area. Holes and scratches are examples of deviations that affect surface roughness. Surface flatness is the deviation from parallelism over a large area. Warping, bending, creeping are examples of deviations that affect surface flatness.

When two rigid materials are polished flat using the best techniques available today for integrated circuits, the surface flatness is on the order of micrometers over a square centimeter area. Furthermore, heat and other stresses can cause changes in warping and bending over time, presenting a further challenge in maintaining uniform separation once achieved. A polished metal or semiconductor surface using today's techniques can easily achieve a roughness of less than 0.5 nanometers.

The state of the art of a tunneling energy conversion device suffers from one or more of the following limitations: (1) a separation that is too large for tunneling, (2) an area that is too small for significant energy conversion, (3) layers of solid material that cannot be thermally isolated resulting in low conversion efficiency, and (4) a design that is too complex to manufacture cost effectively.

A separation of 10 microns or more has been achieved by many thermionic systems, but these systems only operate at very high temperatures, require a costly design for safety, and are limited to environments where this temperature is achieved.

A separation of about 2.0 to 20.0 nanometers has been achieved by a method taught in U.S. Pat. No. 4,343,993 (Binnig, et al.) in the design of the scanning tunneling microscope, but the effective area was on the order of a few square nanometers. Such area was too small (compared to the desired area of about one square centimeter or more) to allow enough current to flow through, even in the most optimal of materials, to convert significant energy.

The semiconductor industry teaches and employs many methods for controlling physical parameters like film thicknesses that are on the order of several nanometers. Thermoelectric devices are an example of integrated circuits that convert energy with a stack of layered materials. See *Design and Characterization of Thin Film Microcoolers*, by Chris LaBounty, Ali Shakouri, and John E. Bowers, Journal of Applied Physics, Volume 89, No. 7, 1 Apr. 2001. However, these methods all require solid materials to be in contact with each other in layers. The heat flows easily from layer to layer, limiting the temperature difference and the conversion efficiency. Because the two electrodes are in contact, the design is at the mercy of available thermoelectrically sensitive materials, and the energy barrier for the electrons to traverse cannot be arbitrarily configured, as is possible by setting the width of a vacuum gap. The materials having needed properties are exotic and expensive elements like bismuth and telluride. For these reasons, thermoelectric devices are limited to a high cost per watt of cooling power and a low efficiency of about 7 percent.

The art of separating two conductors by about 2.0 to 20.0 nanometers over a square centimeter area has been advanced by the use of an array of feedback control systems that are very precise over these distances. A control system includes a feedback means for measuring the actual separation, comparing that to the desired separation, and then a moving means for bringing the elements either closer or further away in order to maintain the desired separation. The feedback means can measure the capacitance between the two electrodes, which increases as the separation is reduced. The moving means for these dimensions is, in the state of the art, an actuator that produces motion through piezoelectric, magnetostriction, or electrostriction phenomena. U.S. Pat. No. 6,720,704 (Tavkhelidze, et al.) describes such a design that includes shaping one surface using the other and then using feedback control systems to finalize the parallelism prior to use. Because of the elaborate processes involved in shaping one surface against the other and the use of multiple feedback control systems to maintain parallelism, this design approach is a challenge to manufacture at a low cost.

Other methods have been documented in U.S. Pat. No. 674,003 (Tavkhelidze, et al.), and US Patent Applications 2002/0170172 (Tavkhelidze, et al.), and 2001/0046749 (Tavkhelidze, et al.) that involve the insertion of a "sacrificial layer" between the electrodes during fabrication. The sacrificial layer is then evaporated to produce a gap between the electrodes that is close to the desired spacing of 2 to 20 nanometers. These three methods are either susceptible to post-fabrication fluctuations due to warping or thermal expansion differences between the electrodes, or require the array of actuators to compensate for these fluctuations.

Another method of achieving and maintaining the desired spacing over time is documented in U.S. Pat. No. 6,876,123 (Martinovsky, et al.) and in US Patent Application No. 2004/0050415 through the use of dielectric spacers that hold the spacing of a flexible electrode much like the way poles hold up a tent. One disadvantage of these dielectric spacers is that they conduct heat from one electrode to the other, reducing the efficiency of the conversion process. Another disadvantage of this method is that the flexible metal electrodes can stretch or deform between the spacers over time in the presence of the large electrostatic forces and migrate slowly toward a spacing that permits conduction rather than tunneling or thermionic emission.

There remain continuing and difficult challenges in meeting the requirements for achieving and maintaining electrode spacing at less than 20.0 nanometer separation gaps, and in mass-producing low cost thermo-tunneling devices, in spite of efforts to date.

An additional utility for a device that can move electrons across a vacuum gap (in addition to providing cooling directly) is to place this gap on top of the thermoelectric stack. In this combination, the hot side and the cool side of the thermoelectric gap become thermally insulated and hence more efficient. A device with a combination of thermoelectric materials and a vacuum gap can provide cooling or heat conversion via thermoelectric methods, thermo-tunneling methods, thermionic methods, or a combination of these methods.

A need, therefore, exists for an improved design for maintaining separation between electrodes in tunneling, diode, and other devices that is more efficient and less costly than existing designs. In particular, a need exists for a design having closely spaced electrodes with a uniform gap. More particularly, a need exists for a design having a pair of electrodes which self-position and self-align at a close spacing gap between them to enable the transfer of electrons across the gap by tunneling, thermionic, or other emission, possibly in combination with thermoelectric elements.

SUMMARY

The present disclosure is directed to overcoming the aforementioned challenges and providing the aforesaid improved design. A device and a process are disclosed that employ electron flow for an additional purpose over prior art designs. In prior designs of the physics literature and the patent prior art designs, the flow of electrons in the tunneling device was used for two purposes: (1) as a thermodynamic fluid to transfer heat from one conductor to another, and (2) to move the converted energy directly to or from a battery or electrical circuit. In the present disclosure and its embodiments, the electron flow is used simultaneously for a third purpose, to generate a restoring force that balances the electrostatic and other attractive forces at a desired separation of the electrodes. This third purpose is achieved by having the electrons flow properly in a magnetic field, and thereby generate the forces according to a known law of physics. Because the invention is a thrice-dimensionally constrained system, extensive and non-trivial effort was needed to find designs wherein all three uses of electrons could achieve their purpose and still have a practical thermal conversion device.

A device and a process are disclosed providing closely spaced electrodes with a uniform gap. More particularly, the disclosure concerns a pair of electrodes which self-position and self-align at a close spacing gap between them to enable the transfer of electrons across the gap by tunneling, thermionic, or other emission, possibly in combination with thermoelectric elements.

The present disclosure uses a flexible material for one of the electrodes, and includes a magnetic field to counterbalance electrostatic attractive forces with magnetostatic repelling forces that naturally and simultaneously act on the flexible electrode to position, align and maintain it in a stable equilibrium position at a desired spacing distance from the other electrode surfaces over a large area, and adapt to continual spatial deviations from flatness in either electrode.

A surface roughness of less than 0.5 nanometer is achieved by polishing the electrodes' facing surfaces before assembly. Polishing techniques are readily available in the industry for achieving less than 0.5 nanometers surface roughness on metals, semiconductors, and other materials.

In order to achieve a separation of less than 20.0 nanometers across a large area of one square centimeter or more, a combination of non-contacting forces are generated to cause the electrode materials to come to rest at the desired spacing. In a stable equilibrium conditions, one force that is already present in these diode devices is the electrostatic force between the emitter and collector. As a voltage is applied, opposite charges assemble on each of the electrodes and the presence of these charges results in an attractive force between the electrodes. Although the electrostatic force is considered to be the dominant attractive force in closely spaced electrodes, other attractive forces are also present such as gravity, surface tension, Van der Waals forces, Casimir forces, and static friction.

The embodiments of the present disclosure create a second equal but opposite force which acts on the flexible electrode to balance the attracting electrostatic force and other attractive forces at all points such that the flexible electrode maintains the desired spacing and alignment. This new force is explained by a physical phenomenon wherein a force is created when a current flows in a conductor in the presence of a magnetic field. The force acts in a direction that is perpendicular to the plane defined by the direction of the current flow and the direction of the magnetic field.

The magnetic field can be added to the embodiment of the invention by having a permanent magnet near or within the electrodes. Permanent magnet materials like iron, cobalt, and nickel and their alloys are also metals that are highly conductive, both thermally and electrically. Hence, these magnetic materials are compatible with the thermal and electrical conductivity characteristics of the electrodes. Even if it were desired to use a non-conducting magnetic material to provide the magnetic field, such a magnet may be coated by a conductor or simply have a flat conductor mounted to it in order to construct the emitting electrode.

The temperature of the surface where the permanent magnet is placed can affect its operational parameters as magnetic materials lose their magnetization at the Curie temperature level, which is typically between 600 and 1400 degrees Kelvin. However, in the present disclosure, the magnet may be placed either on the cool side or the hot side of the conversion device, so configurations can be found to prevent the magnet from reaching its Currie temperature.

The disclosure provides a way for electrode materials to be brought together in a new, unobvious manner to produce a simple and inexpensive thermo-tunneling or thermionic device which has the following advantages: (1) simplicity by eliminating the need for actuators and control systems required by the prior art, (2) making use of the technology and manufacturing processes already developed in the electric light bulb and semiconductor industries to achieve low cost and mass production, (3) achieving the narrow spacing gaps between electrodes without the use of spacers so as to permit tunneling of hot electrons from one electrode to the other thereby cooling the first electrode, and (4) maintaining a uniform spacing gap over large electrode areas such as one square centimeter.

Other systems, devices, features and advantages of the disclosed device and process will be or become apparent to one with skill in the art upon examination of the following drawings and detailed description. It is intended that all additional systems, devices, features, and advantages be included within this description, be within the scope of the present invention, and be protected by the accompanying claims.

BRIEF DESCRIPTION OF THE DRAWINGS

Many aspects of the disclosed device and process can be better understood with reference to the attached drawings, FIGS. 1-8. The components in the drawings are not necessarily to scale, emphasis instead being placed upon clearly illustrating the principles of the present invention. Moreover, in the drawings, like reference numerals do not need corresponding parts throughout the several views. While exemplary embodiments are disclosed in connection with the drawings, there is no intent to limit the disclosure to the embodiments disclosed herein. On the contrary the intent is to cover all alternatives, modifications and equivalents.

DETAILED DESCRIPTION OF THE EXEMPLARY EMBODIMENTS

Figure 1:
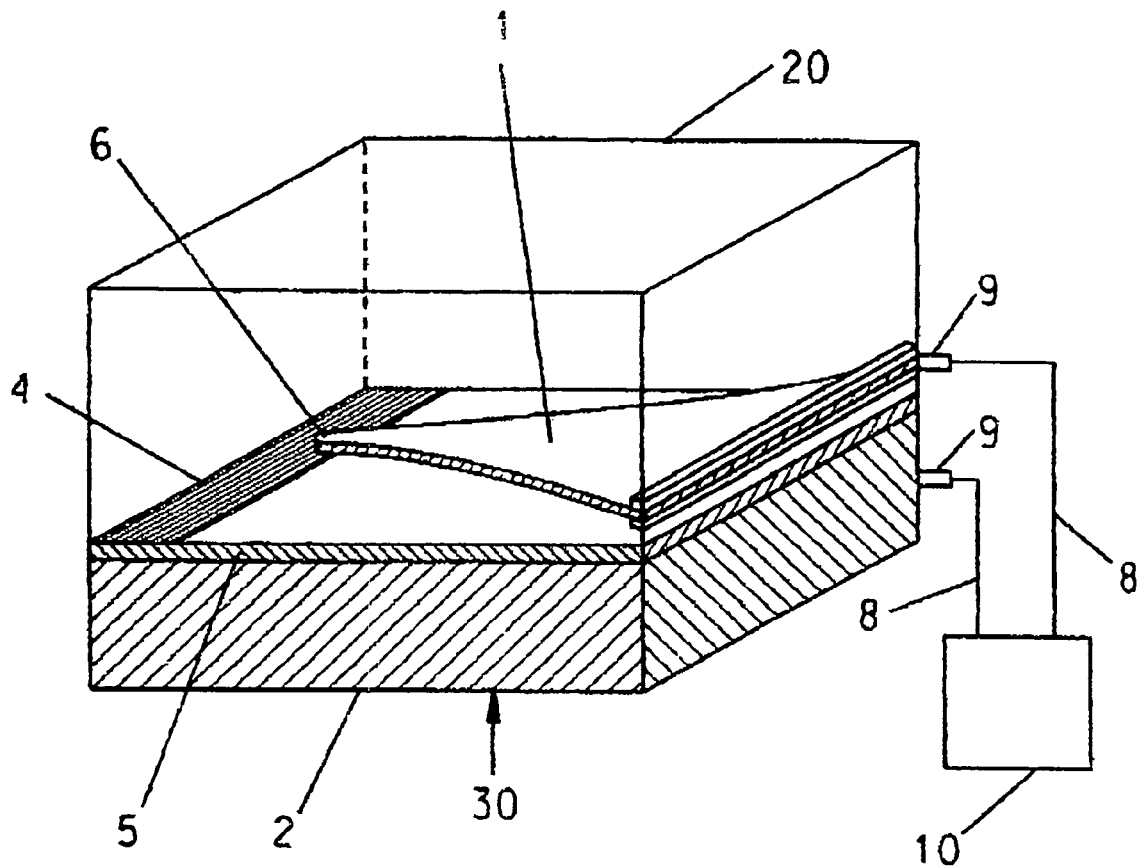
FIG. 1 illustrates one embodiment of the self-positioning electrode device of the present disclosure.

Referring more specifically to the drawings in which like reference numerals refer to like elements throughout the several views, exemplary embodiments of the device and process of the present disclosure are illustrated in FIG. 1-8.

In general, a device and a process are disclosed employing facing electrodes and involving two force distributions. A primarily electrostatic attracting force distribution between the electrodes is generated by an electric charge within the electrodes. An equal but opposite repelling force distribution is generated by the electric current distribution within the electrodes combined with an applied magnetic field distribution. The two force distributions act simultaneously to establish a stable equilibrium separation of the electrodes across their facing surfaces.

FIG. 1 shows one embodiment of the present disclosure. Electrode 1 is a flexible metal foil or a metal foil mounted on a plastic film or substrate like polyimide. The plastic substrate helps prevent the foil from cracking, creasing, or breaking after repeated motions created by electrostatic and electromagnetic forces. The plastic substrate or electrical properties of electrode 1 can also act to prevent vibration or instability of its motion during equilibration. Electrode 2 is a permanent magnet either made of or coated with a conducting material. In an exemplary form electrode 2 is a rectangular block. Both electrodes are polished on the surfaces facing each other. Heat source 30 is present if the device is used for conversion of thermal energy, or is an object to be cooled if the device is used as a refrigerator. Power supply 10 is present if the device is used as a refrigerator and is additionally an electrical load if the device is used as a thermal conversion generator. Insulating layer 4 is present to allow a non-conducting resting point for tip 6 of electrode 1 when the device is not in operation (i.e., while the device is turned off). Additionally, one of the electrodes can have a coating of a non-conducting material thinner than the desired equilibrium spacing between the electrodes on which another of the electrodes rests when the device is not in operation. Layer or coating 5 on top of electrode 2 is a material designed to have a low work function to facilitate electron tunneling between electrode 2 and electrode 1. Connectors 9 and wires 8 complete the circuit. Chamber 20 seals the area between the facing electrodes 1 and 2 with either a vacuum or inert gas to minimize heat transfer from one electrode to the other. Suitable gases include argon and helium. The wider end of flexible electrode 1 is fixedly mounted to a support structure in chamber 20, and electrode 1 comes to rest at tip 6 on the insulating layer or film 4 when the power is off.

Figure 1A:
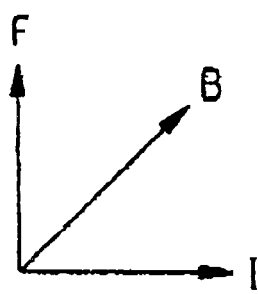
FIG. 1a illustrates the directional status of current, the magnetic field, and the magnetostatic force in the device of FIG. 1

FIG. 1a indicates the directional status of the current (I) flowing in electrode 1, the magnetic field (B) generated by the presence of the permanent magnet within electrode 2, and the force F resulting from the interaction of I and B. The force F acts in the vertical upwards direction at every point on electrode 1, opposing and balancing the electrostatic attracting force that pulls electrode 1 downwards toward electrode 2.

Figure 1B:
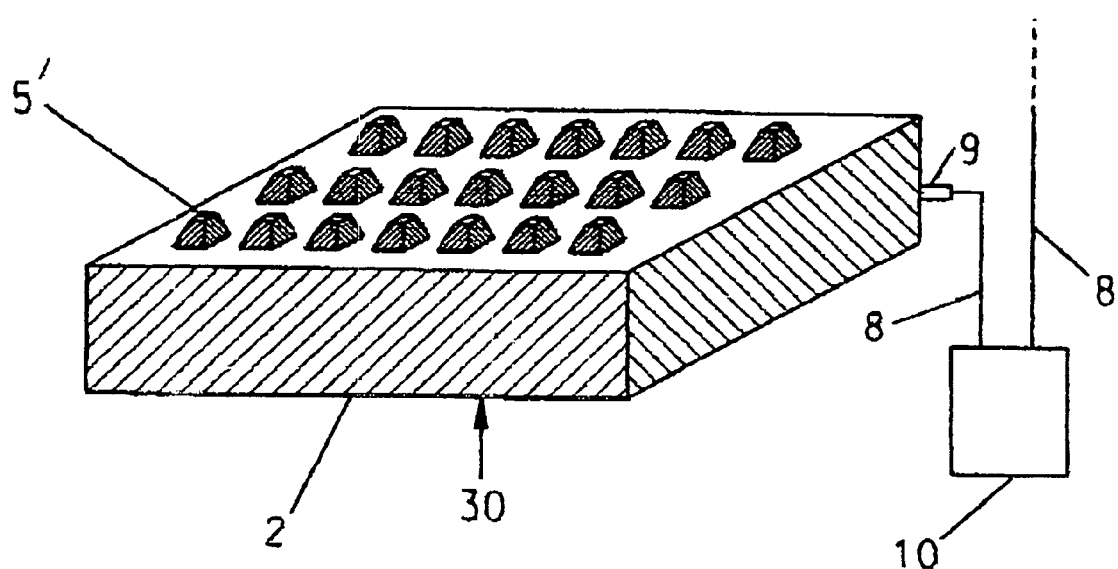
FIG. 1b illustrates an alternate embodiment of electrode 2 in the device of FIG. 1.

FIG. 1b shows an alternative arrangement for electrode 2. Here, the surface of the material is patterned with an array of peaks 5. The geometry of these peaks permits enhancement of electron emission from electrode 2 due to magnified electric fields in the region of the peaks. These peaks may also occur naturally due to intended or unintended roughness of the surface of electrode 2 after polishing.

The device of FIG. 1 may also have additional force generating or altering mechanisms or systems to assist its operation during power-off, equilibrium, or transitioning from power-off to equilibrium or transitioning from equilibrium to power-off. For example, these mechanisms could dampen the system to prevent vibrations or oscillations of electrode 1 around its equilibrium resting position. These additional forces may be created mechanically, magnetically, electromechanically, electromagnetically, or by other ways to offset deficiencies or excesses in the magnitude of the primary electrostatic and magnetic counter-balancing forces.

The material for flexible electrode 1 can be a conductive metal, a semiconductor material, layered glass/metal or layered metal/plastic. Exemplary conductive metals include gold, silver, aluminum, and copper. Exemplary semiconductor materials include silicon, germanium and gallium arsenide. The conductive metal or semiconductor material can optionally be mounted on or combined in layers with a material that adds flexibility to the metal if the metal is not sufficiently flexible by itself, such as glass, polyamide, polyester, polyimide, polyacrylic or polyolefin.

The permanent magnet of electrode 2 can be either contained within or be a part of the electrode. In an exemplary embodiment the permanent magnet can contain conducting ferromagnetic materials in any combination of iron, cobalt, nickel, neodymium or aluminum. Alternatively, the permanent magnet can contain one or more non-conducting ferromagnetic materials coated with a conducting material. Exemplary non-conducting ferromagnetic materials include ferrite, barium ferrite, and iron oxide particles sealed in a binder.

Layer or coating 5 on electrode 2 can be a low work function material, a thermoelectrically sensitive material, a resonant tunneling material, an electric field enhancing texture, or a combination of these. Exemplary embodiments of a low work function material include any layered or other combination of alkali metal, an alloy of alkali metal, an oxide, or diamond such as diamond film. A collection of peaks and valleys arising from surface roughness or patterning (as, for example, illustrated in FIG. 1b) can enhance the electric field and hence improve electron emission from electrode 2. Finally, a semiconductor layer arranged to achieve resonant tunneling can also improve electron emission. Exemplary semiconductor materials include silicon, germanium and gallium arsenide. Exemplary thermoelectrically sensitive materials include bismuth telluride of various dopings.

The low work function material in layer 5 of FIG. 1 or enhancing material 5' in FIG. 1b can be, for example, cesium (Cs), barium (Ba), strontium (Sr), rubidium (Rb), sodium (Na), calcium (Ca), Lithium (Li), and combinations or oxides thereof. Such materials are shown to reduce the work function of the emitting electrode 2 from 4-5 eV down to as low as 1.1 eV or lower. Additional low work function materials include thorium (Th), metal-coated oxides and silicon. Other materials not mentioned here can also achieve low work functions, and the addition of such a layer of material is an obvious extension of the invention. For example, a different type of layer, wide gap semiconductor layer to facilitate electron tunneling is proposed by Korotkov. See *Possible Cooling by Resonant Fowler-Nordheim Emission*, by A. N. Korotkov and K. K. Likharev, Applied Physics Letters, Volume 75, No. 16, 23 Aug. 1999. Therein, a thin oxide layer, whose thickness is controlled carefully, excites the electrons to a resonant condition thereby assisting the hot electrons to escape to the vacuum. Also, layer 5 of FIGS. 1 and 5' of FIG. 1b could be an array of carbon nanotubes or a similar arrangement to maximize emission and minimize work function. Insulating layer 4 materials may include glass, polyimide, or other plastics.

The flow of the electrons in FIG. 1 and the uniqueness of the invention can be described as follows. The free electrons flow from the power supply or electrical load 10 to the emitting electrode 2. The free electrons that are emitted from electrode 2 to electrode 1 are selected by this design to be the hot electrons that can remove heat from electrode 2. One aspect of this invention is that the free electrons flow within electrode 1 from left to right in FIG. 1. in the presence of a magnetic field B directionally shown in FIG. 1a. This free electron flow direction in combination with the applied magnetic field generates a repelling force directionally shown in FIG. 1a that balances the attractive electrostatic force and achieves a constant and desired separation between electrode 1 and electrode 2 over a large area.

Figure 2:
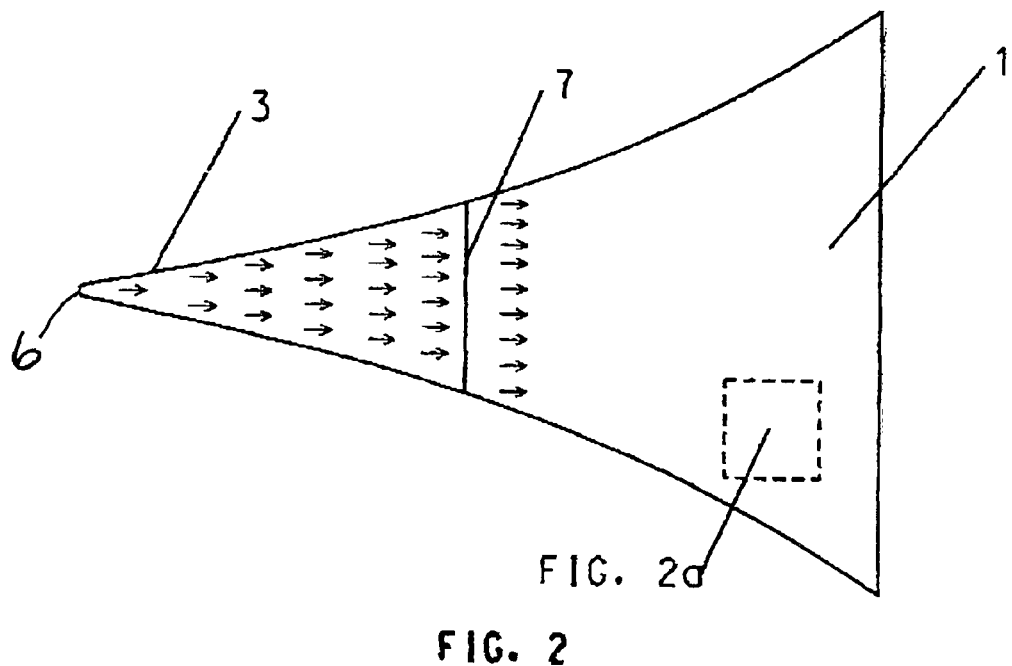
FIG. 2 is a schematic top plane view of electrode 1 of the device of FIG. 1.

FIG. 2 is a schematic of a top view of the exemplary embodiment of electrode 1 in FIG. 1 showing a cross-section 7 with arrows pointing in the direction of electron flow. Cross-section 7 has a current density equal to the aggregate tunneling current that is picked up by all of the electrode's surface to the left of 7 divided by the length of cross-section 7. As the tunneling current is expected to be proportional to the area of tunneling activity to left of 7, then the length of cross-section 7 will optimally increase in proportion to the increase in area of the electrode surface to its left. The border 3 of electrode 1 therefore traces out an exponential function. Thus, the width of the surface of flexible electrode 1 grows exponentially from its tip 6 to its opposite end. An exponential function is mathematically equal to the area bounded by it and the X-axis up to its integration point. The function traced out by border 3 can also compensate for other variations in current density, such as electrical resistance due to path length inside electrode 1. Also, in some cases, the design can be sub-optimized with a triangular shaped electrode 1 for ease of manufacturing.

Figure 2A:
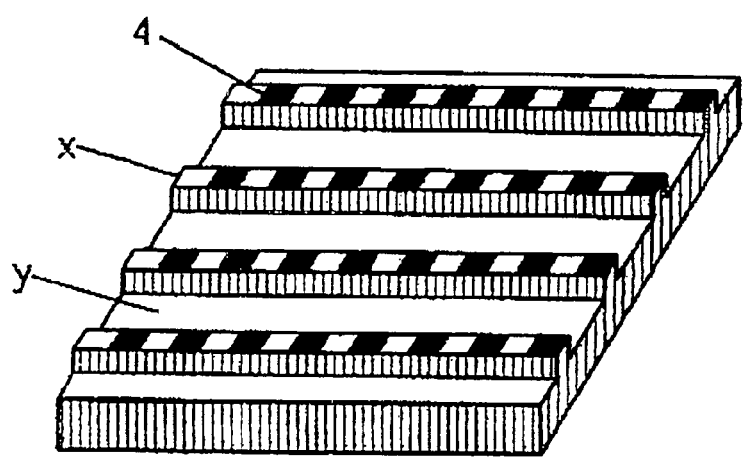
FIG. 2a is a perspective bottom view illustrating a cut out portion of an embodiment of the electrode of FIG. 2.

FIG. 2a is a schematic view of the bottom side of the cut out portion of electrode 1 shown in FIG. 2. It illustrates how electrode 1 may be patterned on its bottom surface, which faces electrode 2. The pattern allows the tunneling area (defined by the total area X of elevated surface x) to be different from the total area Y that is available for current to flow. Patterning electrode 1 in this way allows for larger total area Y and hence lower electrical resistance losses and heat generation losses for the aggregate current to flow. At the same time it minimizes the area that is close to electrode 2, which reduces the electrostatic force that must be overcome to place the electrodes in their desired positions. The same effect of patterning of electrode 1 may also be accomplished by intentional or unintentional surface roughness after polishing. The intermittently elevated segments 4 are thin insulating layers which can support electrode 1 and prevent electrical shorts as the foil material of electrode 1 drapes toward electrode 2 when the device is turned on.

Figure 3:
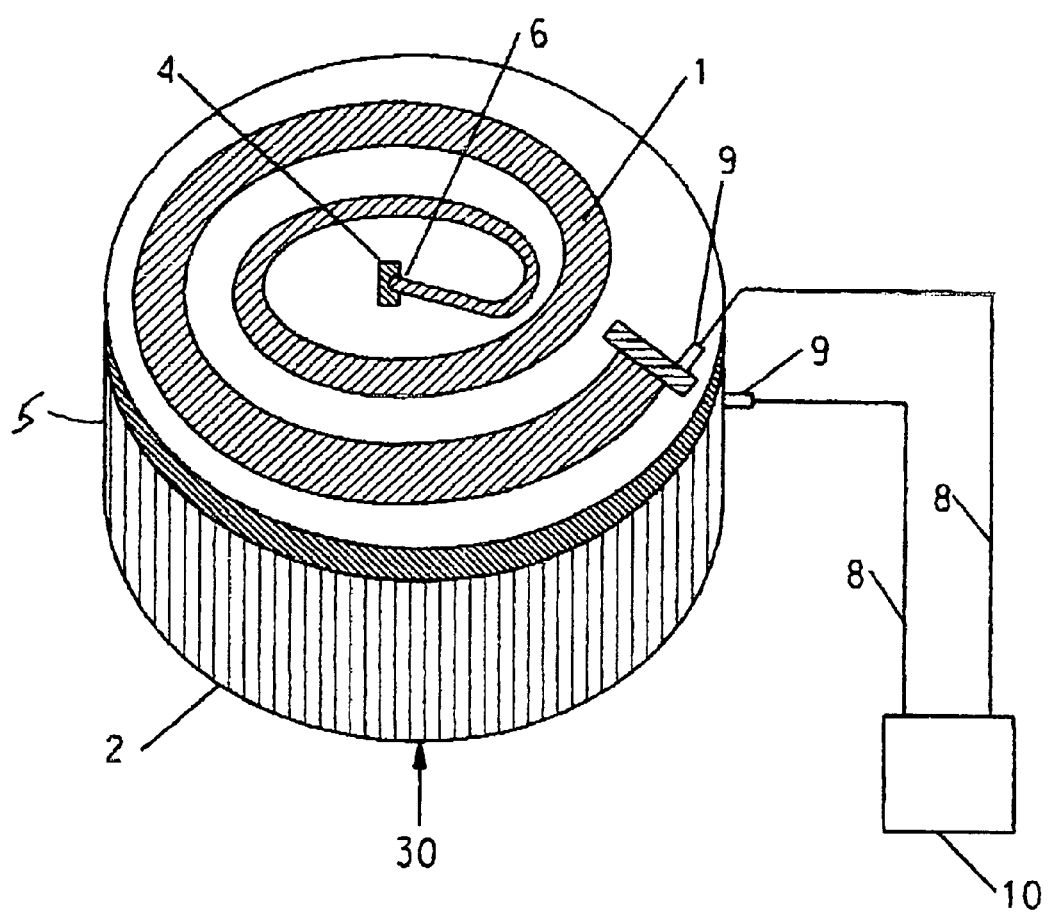
FIG. 3 illustrates an alternative embodiment of the device of FIG. 1.

FIG. 3 is a schematic showing another embodiment of the present disclosure that can achieve a more compact package. Here, electrode 2 is a cylindrical permanent magnet with magnetization direction emanating radially outward from the center. Electrode 1 now takes the shape of an exponential spiral, whose width increases exponentially with every turn. Alternatively, electrode 1 can have a linearly increasing spiral shape as a simpler approximation to the exponential spiral shape for ease of manufacturing. Because electrode 1 has a spiral shape, the current flow is in the tangential direction. The force on electrode 1 acts in the vertical direction, providing a repelling force that balances the electrostatic attracting force similar to that achieved in FIG. 1. The spiral shape of electrode 1 makes this embodiment have a more compact design, because the total tunneling area is not required to be spread across one long dimension as in FIG. 1. Cylindrical magnets with radial magnetization (measuring the magnetic field in a radial direction from the center of the device) are routinely available in the industry, as they are popular for building loudspeakers. The remaining components of this embodiment are the same as FIG. 1.

Figure 4:
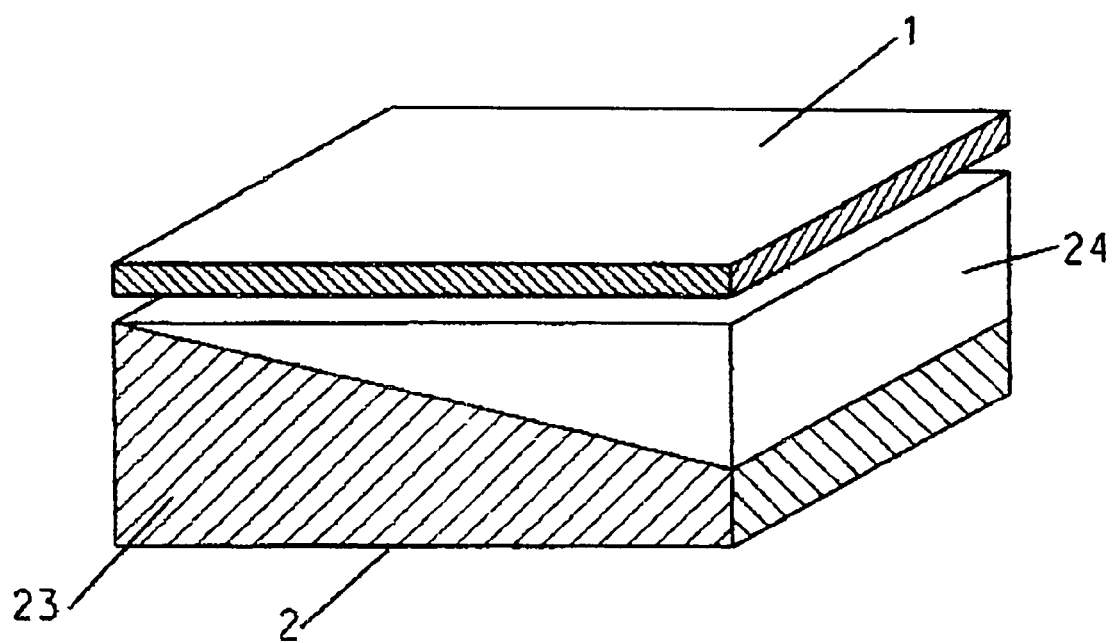
FIG. 4 illustrates yet another embodiment of the device of FIG. 1.

There are many other obvious embodiments to this invention in addition to the embodiments in FIGS. 1 and 3, which use a special shape of one electrode to achieve a uniform repelling force. FIG. 4 is a schematic drawing of one such other exemplary embodiment. It uses a varying magnetic field instead of a varying width electrode. For example in FIG. 4, the current density in electrode 1 increases from left to right as more current is made available from the tunneling area. In order to achieve a uniform force across electrode 1, the magnetic field is deceased from left to right because less field strength is needed as more current density is developed. Thus, the strength of the magnetic field varies in inverse proportion to the current density in flexible electrode 1 so as to achieve a constant force. One way for the magnetic field to decrease from left to right is to vary the depth of the permanent magnet material 23 contained in electrode 2 and increase the amount of non-magnetized material 24, such as copper or aluminum.

Figure 5:
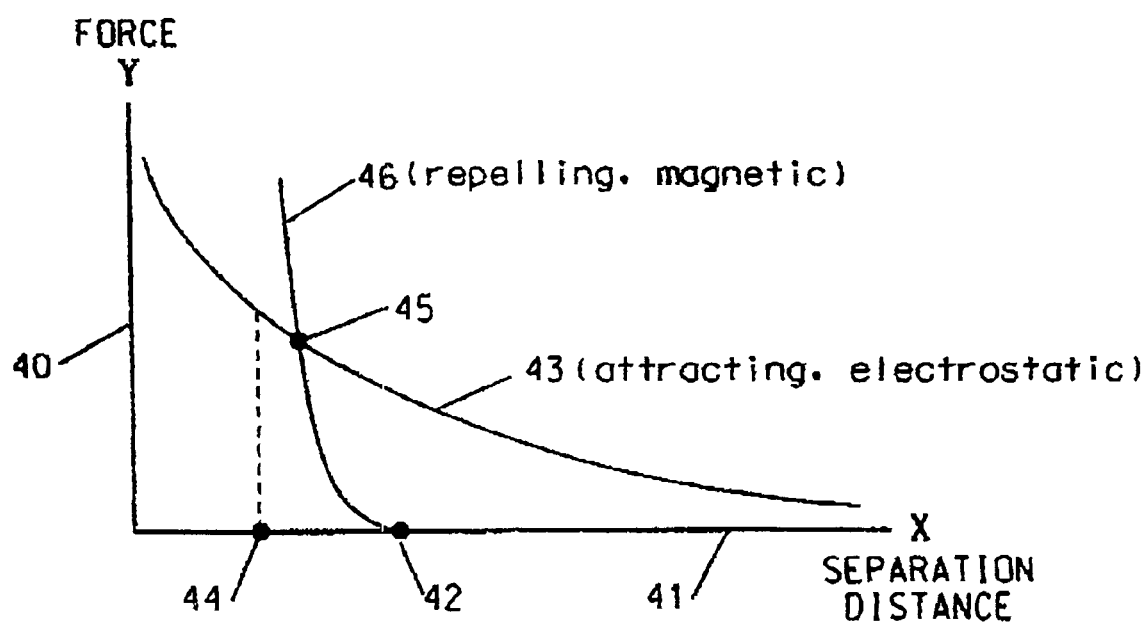
FIG. 5 is a graph qualitatively illustrating interacting forces in the devices of FIGS. 1, 3 and 4.

FIG. 5 is a graphical illustration showing how the forces interact in FIGS. 1 through 4 to produce a constant spacing between the two electrodes over the tunneling area. The Y-axis 40 is force, and the X-axis 41 is spacing gap width or separation distance between the electrodes. Curve 43 shows the attracting, electrostatic forces between electrode 1 and electrode 2. The force illustrated in curve 43 is inversely proportional to the square of the spacing gap 41. Curve 46 shows the repelling force between the two electrodes generated by the tunneling current flowing in the presence of the magnetic field. This current is close to zero until the separation becomes narrow enough for tunneling to occur. Then it increases very rapidly as the spacing decreases further. The locations of the starting separation point for tunneling 42 and the separation point for full conduction 44 depend on the process conditions used. For example the starting separation point 42 for tunneling is around 20 nanometers for a device with an applied potential of 0.1-2.0 volts, and the point of essentially full conduction 44 is around 1 nanometer, according to Hishinuma. See *Efficiency of Refrigeration using Thermotunneling and Thermionic Emission in a Vacuum: Use of Nanometer Scale Design*, by Y. Hishinuna, T. H. Geballe, B. Y. Moyzhes, and T. W. Kenny, Applied Physics Letters, Volume 78, No. 17, 23 Apr. 2001; and *Measurements of Cooling by Room Temperature Thermionic Emission Across a Nanometer Gap*, by Y. Hishinuma, T. H. Geballe, B. Y. Moyzhes, and T. W. Kenny, Journal of Applied Physics, Volume 94, No. 7, 1 Oct. 2003. The attracting and repelling forces are equal at point 45. This is the separation where the device comes to rest in its stable equilibrium position. If any disturbances to the device cause a separation greater than point 45, the attracting force 43 overpowers the repelling force 46, causing tendency to move back to equilibrium point 45. Similarly, any disturbance that causes separation to be less than point 45, the repelling force 46 overpowers the attracting force 43 and again restores the device to its the equilibrium point 45.

In addition to the aforementioned electrode arrangement, the electrodes can also be arranged in multiple layers of periodic spacing. Additionally, multiple units of the device can be assembled in series, or in parallel, or in parallel and in series in order to achieve higher levels of energy conversion.

In operation, the strengths of the current distribution or density in flexible electrode 1 and the magnetic field of facing electrode 2 are adjusted to place the electrodes in a stable, spaced apart, equilibrium position. In one exemplary embodiment, when the device of the present disclosure is used in converting heat to electrical energy or to cool using electron tunneling or thermionic electron transfer, or a combination of electron tunneling and thermionic principles, the strengths of the current density or distribution in electrode 1 and the magnetic field of electrode 2 can be adjusted to place the facing electrodes in a stable, spaced apart, equilibrium position in the range of 1 nanometer to 20 nanometers using a flexible metal foil for one electrode. In another exemplary embodiment, when the device of the present disclosure is used in heat conversion to cooling or power generation by thermionic electron transfer, the strengths of the current density or distribution in electrode 1 and the magnetic field of electrode 2 can be adjusted to place the facing electrodes in a stable, spaced apart, equilibrium position in the range of 1 nanometer to 20 nanometers using a silicon wafer as the substrate for one or both electrodes The device of the present disclosure can be used in a process to convert heat to cooling or to electrical energy. The heat source can be a radiation source such as sun radiation, heat from the environment, geothermal energy, or heat generated from engines or animal metabolism, such as but not limited to heat from a living human body. The heat source can also be from a running electrical, steam or internal combustion engine, or by burning fuel as in a stove such as a wood stove or coal stove or other stove type, or their exhaust gases. When the heat source is, for example, from a running internal combustion engine or its exhaust gases, the present device can be incorporated in the engine or gas exhaust line as a heat sink. The fuel for burning can be wood, natural gas, coal or other combustible fuel. The converted energy can be stored such as in a battery or directed to power a handheld electrical device such as a cell phone, cordless phone or other aforementioned product.

The operation of the device of the present disclosure will now be explained when it is operating as a refrigerator. Referring again to FIG. 1, a voltage, increasing from zero, is applied between electrode 1 and electrode 2 by power supply 10. This voltage results in an electrostatic force that pulls the tip 6 of electrode 1 toward the surface of electrode 2. As the voltage is increased gradually, flexible electrode 1 bends downward toward the surface of electrode 2 in a rolling fashion starting from tip 6. This bending continues until electrode 1 gets so close to electrode 2 that a tunneling current starts to flow upwards from electrode 2 to electrode 1. This tunneling current, once reaching electrode 1 flows horizontally to the right within electrode 1 toward connector 9. Because this current is flowing in the I direction of FIG. 1a, and the magnetic field produced by the permanent magnet in nearby electrode 2 is in the B direction, then a force will act to push electrode 1 upwards. So long as the voltage from supply 10 continues to be increased, electrode 1 will flatten and match contours with the surface of electrode 2. The electrostatic force acts to pull the two electrode surfaces toward each other, and the opposing force from the current flow in electrode 1 prevents the two electrodes from getting closer than the desired spacing.

The operation of the device of the present invention as a generator device is similar, except that heat source 30 generates "hot electrons" moving from a high energy state of being hot in electrode 2 to a lower energy state of being cool in electrode 1. It is this motion of electrons from one energy state to another that creates the current flow between the electrodes. Electrical load 10 becomes the sink for the electrical energy thus produced.

In refrigeration operation, the electrical energy is used from the power supply to pull the hot electrons away from electrode 2 thereby cooling it. When operating as an electrical generator, heat source 30 is used to push electrons to the power supply.

EXAMPLES

The designs of the devices described in the following examples are theoretical designs. They have never been built but are expected to perform as intended. They are based on fundamental laws of physics in conjunction with experimental data and measurements obtained by academic scientists as described herein. These examples will show that: (1) the device of this disclosure can be designed and built using dimensions and processes that are common in the industry, (2) the quantified forces generated will result in the desired electrode separation, and (3) the electrical properties of the invention device can carry and transmit the converted electrical energy effectively. The examples demonstrate the above three attributes of the invention device for thermo-tunneling converters, in which the electrode separation is less than 20 nanometers.

Example 1

For a thermo-tunneling converter, consider the following dimensions in FIG. 1, 2 or 3:

The total overlapping tunneling area Y of the facing electrodes is 1 square centimeter or $10^{-4}$ square meters. The length L of the flexible electrode 1 is 2 centimeters, and the maximum width W is 1 centimeter. The length L and width W are defined similarly for FIG. 3, but electrode 1 is wrapped around into a spiral shape as compared to a linear shape for FIG. 1. The facing surface of electrode 1 is surface-patterned or has a surface roughness such that the total tunneling area X (the sum of all x's) is one-tenth the total surface area Y or $10^{-5}$ square meters. The permanent magnet material used in electrode 2 has a field strength B of 1.2 Tesla. The voltage V between the electrodes is 0.15 volts. The permittivity constant $\in$ of either vacuum or rarified inert gas between electrodes 1 and 2 is equal to $8.8 \times 10^{-12}$ farads per meter. The resistivity r of the flexible electrode 1 is assumed to be close to that of copper, or $1.7 \times 10^{-8}$ ohm-meter. The resistance of the path of electrons from the upper connector 9 to other, lower connector 9 is assumed to be fully concentrated in electrode 1 due to it needing to be thin and flexible compared to the rest of the circuit. The thickness t of flexible electrode 1 is 20 microns, and therefore is a foil material.

The formula for the attracting electrostatic force $F_e$ is $\frac{1}{2} \in XV^2/d^2$ where d is the separation between the electrodes. The formula for the repelling, magnetic force $F_m$ is ILB where I is the current, and L is the effective average length of the current flow in electrode 1.

The tunneling current I as a function of separation is taken from the graphs of Hishinuma and assumes a work function of coating 5 of FIG. 1 of 1.0 eV, and an operating temperature of 300 degrees Kelvin. See *Efficiency of Refrigeration using Thermotunneling and Thermionic Emission in a Vacuum: Use of Nanometer Scale Design*, by Y. Hishinuna, T. H. Geballe, B. Y. Moyzhes, and T. W. Kenny, Applied Physics Letters, Volume 78, No. 17, 23 Apr. 2001; and *Measurements of Cooling by Room Temperature Thermionic Emission Across a Nanometer Gap*, by Y. Hishinuma, T. H. Geballe, B. Y. Moyzhes, and T. W. Kenny, Journal of Applied Physics, Volume 94, No. 7, 1 Oct. 2003.

Figure 6:
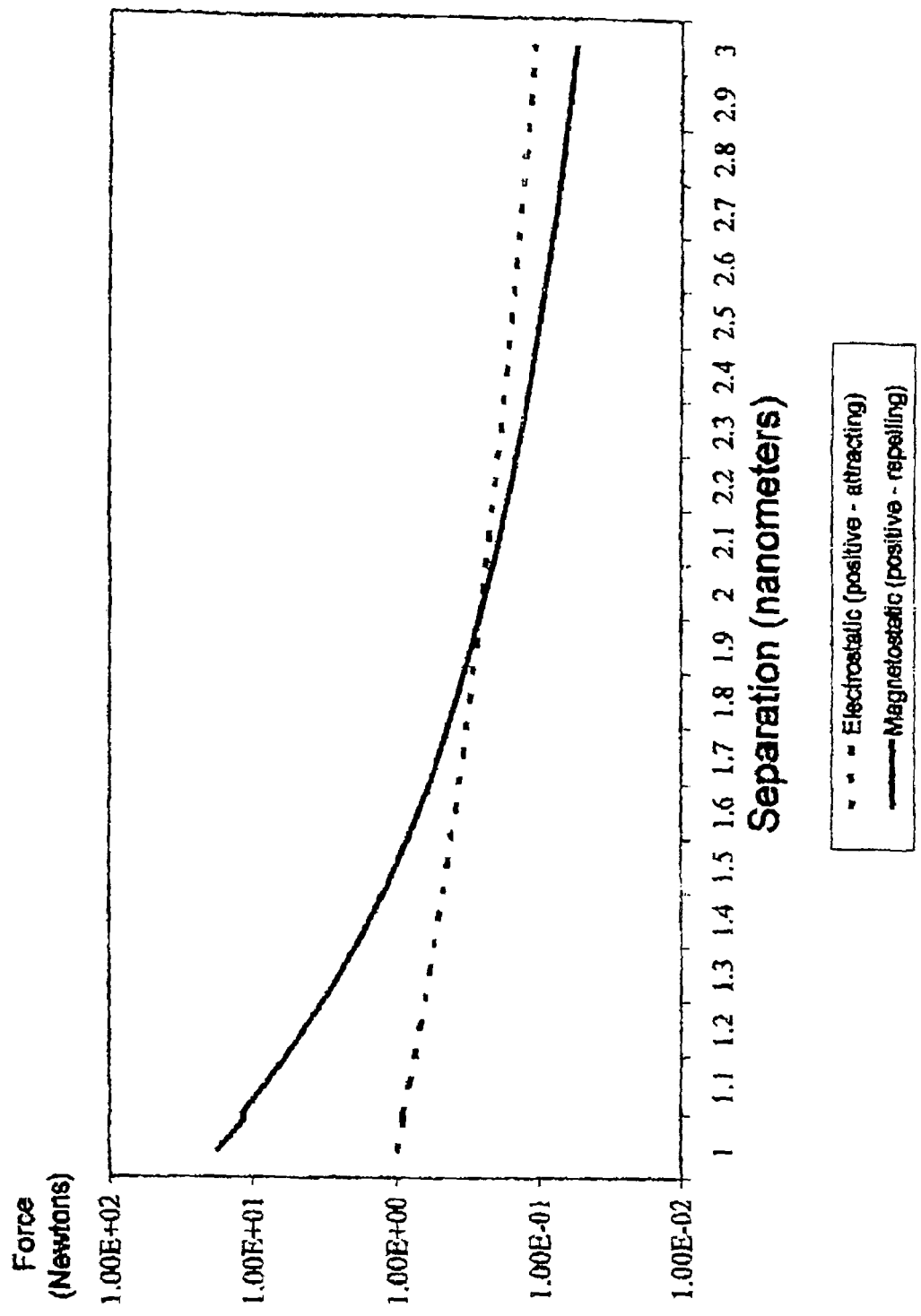
FIG. 6 is a graph quantitatively illustrating interacting forces in the devices of FIGS. 1, 3 and 4 using polished metal electrodes.

In FIG. 6 the force functions $F_m$ and $F_e$, for the values listed above are plotted, with a logarithmic scale, on the Y axis vs. the electrode separation gap d, with an arithmetic scale, on the X axis. This plot produces a graph like FIG. 5 only now it is fully quantified. The stable equilibrium point 45 is close to 2.0 nanometers, which is in the desired spacing range to achieve a tunneling current of 20 amperes, according to Hishimuna. See *Measurements of Cooling by Room Temperature Thermionic Emission Across a Nanometer Gap*, by Y. Hishinuma, T. H. Geballe, B. Y. Moyzhes, and T. W. Kenny, Journal of Applied Physics, Volume 94, No. 7, 1 Oct. 2003. As disturbances try to shift the spacing gap away from the stable equilibrium in either direction, the restoring forces are greater than 0.2 Newton, which is sufficient to overcome the bending resistance of the flexible electrode and push it back to its equilibrium position.

With the emitting electrode at room temperature, a current flow of 20 amps, and a voltage of 0.15 volts, the device can achieve either an electrical power generation capacity or a refrigeration capacity of 16 watts, which is computed as the current (I) times the Peltier coefficient of 0.8 used in this example as described in *Measurements of Cooling by Room Temperature Thermionic Emission Across a Nanometer Gap*, by Y. Hishinuma, T. H. Geballe, B. Y. Moyzhes, and T. W. Kenny, Journal of Applied Physics, Volume 94, No. 7, 1 Oct. 2003. The resistance power lost in the flow of this current through flexible electrode 1 is $I^2rL/tw$. With the values mentioned above, the ohmic power loss calculates at 1.0 watt, which is assumed to be manageable both as a power loss and as a source of heating electrode 1. Heat transfer from electrode 2 to electrode 1 can also take place by radiation, convection and conduction, but is estimated to be no more than 1.3 watt when the chamber of the invention device is evacuated to a level of 0.06 mm Hg of argon gas. Finally, there is an electrical heat generated in electrode 2 as described in *Measurements of Cooling by Room Temperature Thermionic Emission Across a Nanometer Gap*, by Y. Hishinuma, T. H. Geballe, B. Y. Moyzhes, and T. W. Kenny, Journal of Applied Physics, Volume 94, No. 7, 1 Oct. 2003, which is equal to the voltage V times the current I, or about 3.0 watts in this example. The remaining available energy from the 16 watts of converted energy is 10.7 watts. This corresponds to a calculated efficiency of 67 percent.

So, we see that the system level characteristics of this device, based on established electromagnetic theory, support a workable design and a means for reducing to practice for a thermo-tunneling converter with high efficiency.

Example 2

Another example of the versatility of this invention is in the choice of materials. The preferred embodiment, as described in Example 1, includes a metal foil as one of the electrodes. Another embodiment could use a single-crystal silicon as the flexible electrode. Although silicon is not normally regarded as a flexible material, it is routinely fabricated in the industry with a roughness of 0.5 nanometers and a flatness of 1 micrometer across a square centimeter surface. Although silicon is much stiffer than a metal foil as measured by the Young's Modulus, its flatness indicates that very little bending is required to approach ideal flatness. The forces generated by the invention will be shown to be able to bend a silicon wafer by the one micron needed flatten it completely. Overall, using silicon as the base material for the flexible or both electrodes has several advantages: (1) silicon wafers are readily available at low cost, (2) silicon wafers have desirable roughness and flatness characteristics, (3) adding low work function materials or patterns of materials on silicon is readily and frequently performed in the industry, (4) the resistivity of silicon prevents the flexible electrode from reacting too quickly during contact or near contact with the other electrode of the invention, and (5) the desired resistivity of silicon can be arbitrarily controlled through doping, which is also common practice in the industry. Overall, the invention's design can be built with materials and processes that are routinely available in the semiconductor industry.

Figure 8:
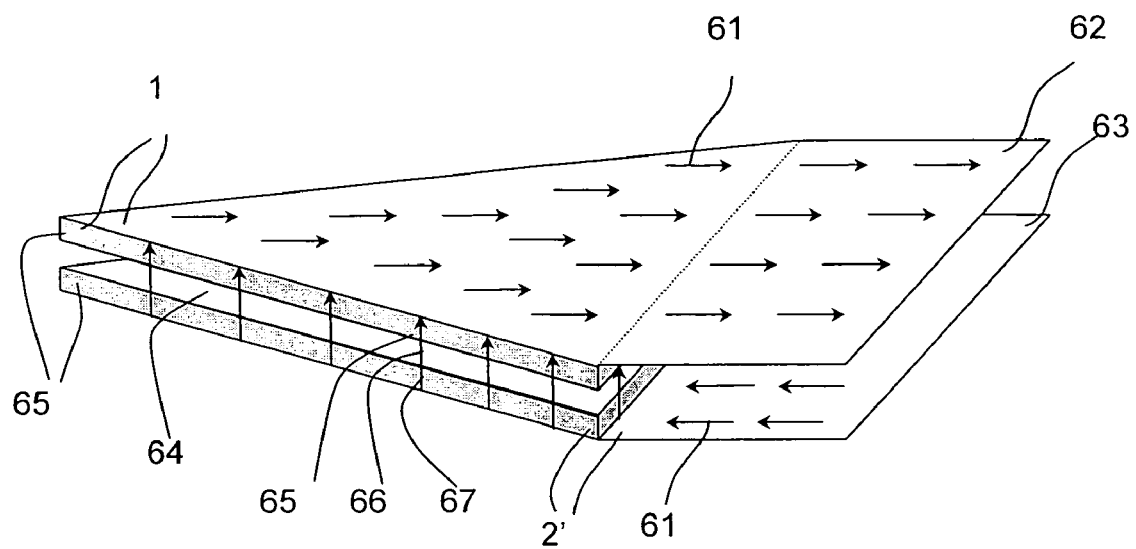
FIG. 8 is a drawing showing how the electrodes may be built from silicon wafer material.

In order to illustrate the example of the invention using silicon for the flexible electrode, consider FIG. 8. Here, electrode 1 is comprised of a foil backing 62 and a silicon substrate 65. The shape of electrode 1 in FIG. 8 is triangular, approximating the optimal exponential shape described in Example 1. The silicon substrate 65 can be cut from a standard wafer and then be bonded to the foil backing 62 of electrode 1 using a conductive adhesive. Electrode 2' in FIG. 8 is constructed like electrode 2 in FIG. 1 only the magnet is not shown and is assumed to be positioned separately. By separating the magnet from electrode 2', it is possible to construct electrode 2' in FIG. 8 using the same materials and process as electrode 1 in FIG. 8. Arrows 61 indicate the directional flow of electrons. Because the foil backing has much higher conductivity than the silicon, the electrons will follow a path of least resistance. Hence, electrons flow from right to left through the foil backing of electrode 2' via conduction, then they flow vertically through the silicon substrate of electrode 2' as indicated by portion of arrow 67, then the electrons flow via tunneling or thermionic emission from surface 64 of electrode 2' to electrode 1 in a vacuum as indicated by portion of arrow 66. Once the electrons reach electrode 1, they again flow through a silicon substrate vertically as indicated by portion of arrow 65 and finally reach the foil backing 62 of electrode 1. Then, they follow a very low-resistance path from left to right through the foil backing 62 of electrode 1. The flow of electrons as indicated directionally by the arrows 61 interact with a magnetic field of a nearby permanent magnet, which is not shown in FIG. 8.

In this example, the total thickness $t_s$ of the silicon is 0.5 millimeter or 0.25 millimeter per wafer, which is an industry standard thickness. The silicon material is doped to have a resistivity $r_s$ of 0.02 ohm-cm, which is also commonly practiced. The Young's Modulus $E_s$ for silicon is known to be 47 Giga Pascals or $4.7 \times 10^{10}$ Pascals. Silicon wafers are routinely polished in the industry to 0.5 nanometers of surface roughness and achieve a surface flatness $d_x$ of 1.0 micron for a wafer of lateral dimensions of one centimeter.

Figure 7:
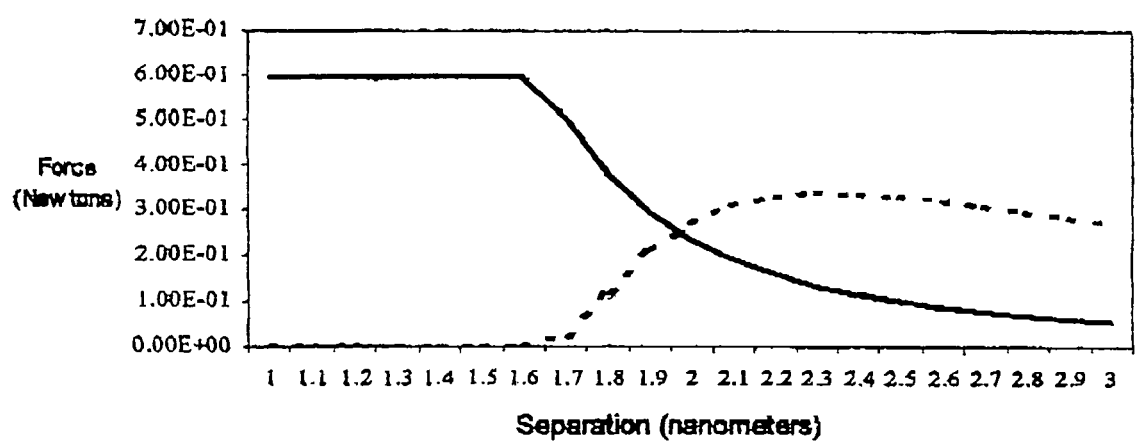
FIG. 7 is a graph quantitatively illustrating interacting forces in the devices of FIGS. 1, 3 and 4 using polished silicon electrodes.

FIG. 7 shows the effect of the silicon on the forces as compared to FIG. 6. The magnetostatic force is limited to 0.6 Newtons as the gap becomes very small. The resistance of the silicon limits the current flow and hence the magnetostatic repelling force. Also, a very narrow gap will cause all of the supply voltage to drop in the silicon resistance, and zero voltage appears across the gap, which means the electrostatic attracting forces are zero for a very small gap spacing.

To quantify these effects, consider the maximum current that can flow in this system, which is the supply voltage V divided by the silicon resistance, which is equal to $r_s t_s/Lw$. For the applied voltage, length, and width of the electrode in the Example 1, the maximum current flow is about 50 amperes when the silicon is present. Furthermore, when the current approaches this 50-ampere level, the supply voltage is all dropped across the silicon and no voltage difference can be achieved across the facing surfaces of the electrodes.

The restoring differential forces in FIG. 7 are relatively large. According the to the figure, a 0.1 nanometer deviation from the desired separation produces a restoring force greater than 0.05 Newtons. This restoring force is much greater than the bending forces required to flatten electrode 1 and much greater than the bending forces required to achieve parallelism with electrode 2, as will now be calculated.

In order to flatten out a one-micron corrugation in electrode 1, a force of $40 d_x E_s w t_s^3 / 12 L^3$ is required. This force calculates to 0.003 Newtons. If electrode 1 and electrode 2 have opposing corrugations, then the required force is twice this amount or 0.006 Newtons, which is much less than the 0.05 Newtons of restoring force available to maintain a gap within 0.1 nanometers of the desired gap.

The force characteristics in FIG. 7 with a silicon electrode material are more desirable than those in FIG. 6 with a metal foil material for the following reasons: (1) the forces with the silicon present do not become so large as to cause oscillations or sudden movement that could damage or destabilize the system as in the case of pure metal electrodes, (2) a silicon wafer's greater flatness versus metal foil allows the system to start out much closer to the desired operating point, (3) the resistance of silicon prevents large currents forming in small localized areas that can result in high temperatures and evaporative damage to the electrode materials, (4) the stiffness of the silicon reduces the amount of movement of the material to sustain the gap over time and hence reducing the risk of fatigue, cracking, or deformation, and (5) the higher stiffness and flatness of silicon insures the gap can be maintained in the presence of local variations which reduces the need for precision in the exponential shape, uniformity of the electrode thickness, and other parameter variations of the materials and design.

Other Examples

The above basic examples indicate how a working thermo-tunneling system can be designed to achieve cooling or power conversion. Other examples are easily designed by altering one or more of the parameters used in Examples 1 and 2. The gap distance can be increased by any combination of the following changes: (1) increasing the magnetic field, (2) decreasing the voltage, (3) increasing the current flow, (4) increasing the length of the flexible electrode, or (5) decreasing the area of the flexible electrode. The gap distance can decrease by making the opposite changes.

It should be noted that several of the features described herein may not be necessary or can be achieved without additional manufacturing complexity. Because the industry has not been able to produce a working thermo-tunneling converter larger than nanometer dimensions, the actual behavior at a larger scale is not known. For example, the low work function layer 5 may not be necessary if the gap can made slightly smaller. The enhancing material 5' might be just as easily accomplished by the surface roughness after polishing, which naturally produces the peaks and valleys that are known to enhance electron emission. The resting tip 6 also may not be required given the choice of resistive materials for electrode 1 or 2. The electrode patterning in FIG. 2a, which also provided peaks and valleys to reduce the electrostatic force, might also be achieved by natural surface roughness after polishing. Finally, the vacuum chamber 20 may not be required if the tunneling process has been demonstrated experimentally in an air gap. In addition, the exponential shape of electrode 1 may be approximated by an easier to manufacture triangular shape. All of these complicating features (tip 6, layer 5, enhancing material 5', patterning in FIG. 2a, the curved shape of electrode 1, and vacuum chamber 20) were included in this disclosure for completeness in describing what might be required in final production.

The devices disclosed herein are versatile in building various types of electronic junctions for the electronics industry that require a uniform gap between electrodes. For example, a thermoelectric device having poor thermal insulation between the hot side and cool side could employ the present disclosure. A vacuum spacing on top of a thermoelectric stack could provide better thermal insulation, and this disclosure provides a means for accomplishing this gap either independent of or in combination with thermionic or thermo-tunneling methods.

A final comment on the ease of manufacturing of the devices disclosed herein involves a discussion of other natural forces that arise when two very smooth surfaces are brought together. Two attractive forces known to hold smooth surfaces together are Casimir forces and Van Der Waals forces. These forces are strong enough to hold the two electrodes of this invention together prior to applying a voltage, but they are not expected to be so strong as to affect the desired interaction and dominance of the electrostatic and magnetostatic forces as described during operation of the invention. However, these Casimir and Van Der Waals forces can assure that the two electrodes are in full surface contact prior to turning the device on with an applied voltage. In this case, the invention's operation merely needs to separate the two electrodes by a few nanometers. These Casimir and Van Der Waals forces also help eliminate the need for insulating layer 4 of FIG. 1, further simplifying the invention's design.

Multiples units of this device can be connected together in parallel and in series in order to achieve higher levels of energy conversion or to match voltages with the power supply or both.

It should be emphasized that the above-described embodiments of the present device and process, particularly, and "preferred" embodiments, are merely possible examples of implementations and merely set forth for a clear understanding of the principles of the invention. Many different embodiments of the self-positioning electrode device described herein may be designed and/or fabricated without departing from the spirit and scope of the invention. All such modifications and variations are intended to be included herein within the scope of this disclosure and protected by the following claims. Therefore the scope of the invention is not intended to be limited except as indicated in the appended claims.

I claim:

1. A device comprising facing electrodes or electrode assemblies wherein two force distributions, a primarily electrostatic attracting force distribution generated by an electric charge within the electrodes or electrode assemblies and an equal but opposite repelling force distribution generated by an electric current distribution within the electrodes or electrode assemblies in the presence of an applied magnetic field distribution, act simultaneously to establish a stable equilibrium separation of the two electrodes across their facing surfaces.

2. The device of claim 1 wherein one of the facing electrodes is a flexible electrode.

3. The device of claim 2 wherein the base material of the flexible electrode is selected from the groups of conductive metals, layered metal/glass, layered metal/plastic composites, or is a semiconductor material.

4. The device of claim 3 wherein the base electrode material is silicon, germanium, or gallium arsenide, or the metal is gold, silver, aluminum, copper, nickel combined or not in layers with glass, polyimide, polyester, polyamide, polyacrylic, or polyolefin.

5. The device of claim 1 wherein the surface of one or more electrodes is made of or coated with or evaporated thereon, a low work function material, a thermoelectrically sensitive material, a collection of peaks and valleys, a semiconductor resonator, a layered material having a resistive lower layer and an upper layer of a low work function, or a combination of these.

6. The device of claim 5 wherein the low work function material is any layered or other combination of alkali metal, an alloy of an alkali metal, an oxide, diamond, or nanotubes.

7. The device of claim 6 wherein the low work function material is cesium, thorium, metal-coated oxide, a diamond film, silicon, germanium, an array of carbon nanotubes or a collection of oxide particles of nanometer dimensions.

8. The device of claim 1 wherein the magnetic field is created by a permanent magnet mounted on or near either electrode.

9. The device of claim 8 wherein the permanent magnet is contained within or is part of one of the facing electrodes.

10. The device of claim 8 or 9 wherein the permanent magnet contains conducting ferromagnetic magnetic materials in any combination of iron, cobalt, nickel, neodymium, or aluminum.

11. The device of claim 8 or 9 wherein the permanent magnet contains non-conducting ferromagnetic materials coated with a conducting material to construct the one electrode.

12. The device of claim 1 with the addition of other forces created mechanically, magnetically, electromechanically, or electromagnetically to offset deficiencies or excesses in the magnitude of said electrostatic and magnetic forces.

13. The device of claim 1 or 12 with the addition of a damping system to prevent vibrations or oscillations of the first electrode around its equilibrium resting position.

14. The device of claim 2 wherein the flexible electrode is shaped to achieve a current density distribution in said flexible electrode that combines with the magnetic field distribution so as to generate a repelling force distribution that equals the electrostatic force distribution at the desired separation distance distribution between the electrodes.

15. The device of claim 14 wherein the width of the surface of the flexible electrode grows exponentially from one end of its length to the other end of its length.

16. The device of claim 1 wherein one or more of the electrodes are patterned or roughened with elevated and non-elevated areas to simultaneously reduce the electrostatic forces and the electrode resistive losses.

17. The device of claim 2 wherein the flexible electrode has one end that is wider than its opposite end and wherein the wider end of the flexible electrode is fixedly mounted on a support structure.

18. The device of claim 2 wherein the flexible electrode has one end that is narrower than its opposite end and wherein the narrow end of flexible electrode rests on an insulating support while the device is turned off.

19. The device of claim 1 wherein a portion of one electrode has a coat of a non-conducting material thinner than the desired spacing between the electrodes, on which another electrode rests while the device is turned off.

20. The device of claim 2 wherein the flexible electrode is a metal foil mounted on a flexible plastic film to provide resistance to buckling or cracking from repeated motion.

21. The device of claim 1 wherein the gap between the electrodes is enclosed in a vacuum chamber.

22. The device of claim 1 wherein the gap between the electrodes is enclosed in a chamber filled with inert gas.

23. The device of claim 22 wherein the inert gas is argon.

24. The device of claim 2 wherein the strength of the magnetic field varies in inverse proportion to the current density in the flexible electrode so as to achieve a constant force.

25. The device of claim 1 wherein one of the facing electrodes is formed into a spiral shape and the magnetic field is in a radial direction from the center of the device.

26. The device of claim 25 wherein the spiral shape is of linearly decreasing width.

27. The device of claim 25 wherein the spiral shape is of exponentially decreasing width.

28. The device of claim 1 further including a heat source connected to the electrodes.

29. The device of claim 1 further including a power supply connected to the electrodes.

30. A process wherein the strengths of the magnetic field and the current distribution in the device of claim 1 are adjusted to place the facing electrodes in a stable, spaced apart, equilibrium position.

31. A process as in claim 30 wherein the facing electrodes are spaced apart in the range of about 20 nanometers or less.

32. A process as in claim 30 wherein the strengths of the magnetic field and the current distribution are adjusted to place the facing electrodes in a stable, spaced apart, equilibrium position spaced in the range of 1 nanometer to 20 nanometers for use in converting heat to electrical energy or to cool using electron tunneling, thermionic electron transfer, thermoelectric effects, or a combination these principles.

33. A process as in claim 30 wherein the strengths are adjusted to produce an electrode spacing in the range of 6 nanometers to 20 nanometers for use in heat conversion to cooling or power generation by primarily thermionic electron transfer.

34. A process as in claim 30 wherein the strengths are adjusted to produce an electrode spacing in the range of 1-6 nanometers for use in heat conversion to cooling or power generation by primarily electron tunneling.

35. A process for using the device of claim 1 to convert heat to cooling or to electrical energy.

36. A process as in claim 35 wherein the heat source is a radiation source, heat from the environment, geothermal energy, or heat generated from engines or animal metabolism.

37. A process as in claim 35 wherein the source of heat is a living human body.

38. A process as in claim 35 wherein the source of heat is living human body and the device of claim 1 is incorporated in a hand held device.

39. A process as in claim 35 wherein the source of heat is a running electrical, steam or internal combustion engine, burning fuel, or their exhaust gases.

40. A process as in claim 35 wherein the source of heat is a running internal combustion engine or its exhaust gases and the device of claim 1 is incorporated in the engine or gas exhaust line as a heat sink.

41. The device of claim 1 wherein the magnetic field strength in one electrode decreases in the same direction as the current density increases in another electrode 1 in order to achieve uniform force distributions acting between the electrodes.

42. The device as in claim 41 wherein the depth of the magnetic material in the permanent magnet of the one electrode is decreased in the direction that the current density increases in said another electrode.

43. A device as in claim 1 wherein the electrodes are arranged in multiple layers of periodic spacing.

44. A process wherein multiple units of the device of claim 1 are assembled in order to achieve higher levels of energy conversion.

45. A process as in claim 44 wherein the multiple units of the device of claim 1 are assembled in series or in parallel or both in order to achieve higher levels of energy conversion.

46. A process as in claim 30, operated at naturally occurring temperatures.

47. A process as in claim 35 wherein the cooling is used in any one or more of the following products: refrigerator, air conditioner, cooling blankets, cooling clothing, or cooling devices attached to the human or animal body.

* * * * *